May. 13, 1947.                J. C. LEE                2,420,603
BOTTLE CARRIER
Filed Nov. 13, 1944
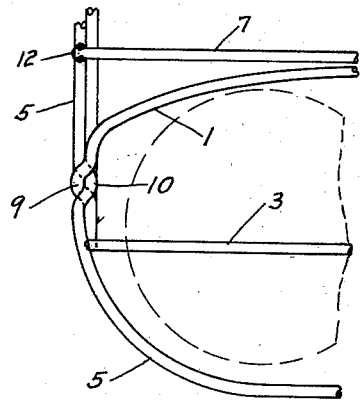
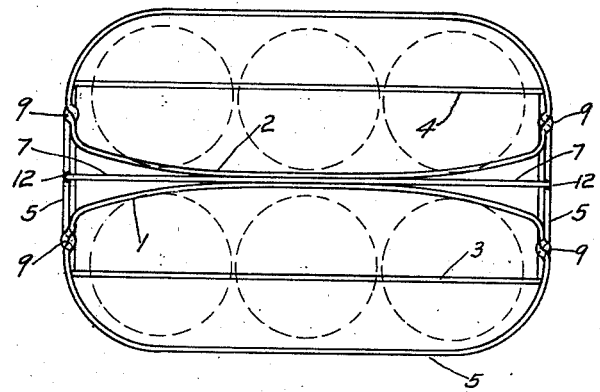
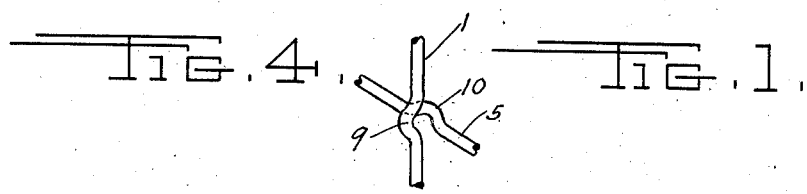
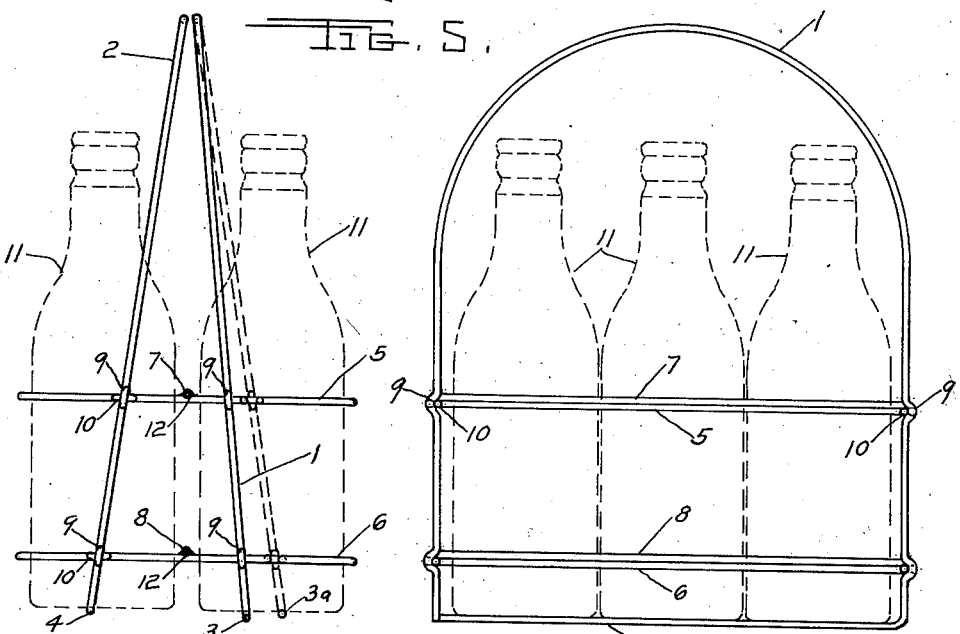
James C. Lee
INVENTOR.
BY Chas. Denegre
ATTORNEY.

Patented May 13, 1947

2,420,603

UNITED STATES PATENT OFFICE 2,420,603

BOTTLE CARRIER

James C. Lee, Birmingham, Ala.

Application November 13, 1944, Serial No. 563,147

1 Claim. (Cl. 224—48)

This invention relates to a collapsible carrier for bottles and has for its main objects to provide such a device that will be durable, cheap to manufacture, and highly satisfactory for the purpose intended. Other objects and advantages will appear from the drawing and description.

By referring to the drawing, part of this application, it will be observed that Fig. 1 is a plan view of the assembled carrier; Fig. 2 is a side elevational view of the assembled carrier showing bottles in same; Fig. 3 is an end elevational view of the assembled carrier with bottles in same, and one member displaced; Fig. 4 is a partial plan view enlarged to show the notches fitted; and Fig. 5 is a detail view of the notches as used to match. Similar reference numerals refer to similar parts throughout the several views.

Again referring to the drawing in detail it will be seen that the carrier comprises a wire basket made with two duplicate members 1 and 2 that provide handle means and bottle supports 3 and 4; and two duplicate members 5 and 6 made oblong with center wire pieces 7 and 8 that are firmly attached at 12 to the outer portion of oblong members. Notches 9 and 10 are bent into handle and oblong members. To assemble the carrier the oblong members are inserted inside the handle members so that the respective notches register with each other. In Fig. 3 one handle member is shown out of place adjacent its regular position indicated by dotted lines 3—a.

The carrier may be made from material best suited for the purpose but I prefer to use semi-stiff wire of a size sufficiently strong enough to support the load and hold its shape.

While I have shown and described the preferred embodiment of my invention, I do not wish to limit same to the exact and precise details of structure, but reserve the right to make all modifications and changes so long as I remain within the spirit and scope of the following claim.

Having described my invention I claim:

A collapsible carrier for bottles comprising two duplicate members made of wire and formed into an endless shape substantially half round and half square, two notches bent into the portion of each extending from the round part to the square part; and two duplicate members made of wire and formed into an endless shape substantially oblong and having two notches bent into each of their shorter portions; and having in each a straight piece of wire extending from the center of the said shorter portion to the center of the opposite shorter portion and firmly attached to said portions; said notches in the round-square members and said notches in said oblong members being adapted when said members are assembled together to hold same firmly as an assembled shape as a bottle carrier.

JAMES C. LEE.

REFERENCES CITED

The following references are of record in the file of this patent:

UNITED STATES PATENTS

| Number | Name | Date |
|---|---|---|
| 2,316,454 | Reid et al. | Apr. 13, 1943 |
| 2,316,738 | Brunhoff | Apr. 13, 1943 |
| 2,334,409 | Hamilton | Nov. 16, 1943 |
| 1,317,443 | Hildreth | Sept. 30, 1919 |
| 1,279,071 | Andrews | Sept. 17, 1918 |
| 2,353,846 | Power | July 18, 1944 |